United States Patent
Ganz et al.

(10) Patent No.: US 6,252,382 B1
(45) Date of Patent: Jun. 26, 2001

(54) METHOD AND ARRANGEMENT FOR SUPPLYING POWER TO A MOTOR VEHICLE ELECTRICAL SYSTEM

(75) Inventors: Thomas Ganz, Stockdorf; Josef Appel, Gauting, both of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/292,974

(22) Filed: Apr. 16, 1999

(30) Foreign Application Priority Data

Apr. 17, 1998 (DE) .............................................. 198 17 057

(51) Int. Cl.[7] ................................................... H02P 9/08
(52) U.S. Cl. ................................................ 322/37; 322/36
(58) Field of Search ................................. 322/10, 11, 12, 322/28, 36, 37

(56) References Cited

U.S. PATENT DOCUMENTS

| | | | |
|---|---|---|---|
| 4,581,572 | * 4/1986 | Yoshiyuki et al. | 322/86 |
| 5,554,819 | * 9/1996 | Baghai-Kermani | 136/206 |
| 5,570,000 | * 10/1996 | Kowalski | 322/1 |
| 5,603,671 | * 2/1997 | Schmidt | 475/5 |
| 5,698,905 | * 12/1997 | Ruthlein et al. | 290/32 |
| 5,767,663 | * 6/1998 | Lu | 322/12 |
| 5,789,882 | * 8/1998 | Ibaraki et al. | 318/148 |

FOREIGN PATENT DOCUMENTS

| | | |
|---|---|---|
| 30 07 003 | 9/1980 | (DE) . |
| 36 04 226 | 8/1987 | (DE) . |
| 39 24 755 | 1/1991 | (DE) . |

* cited by examiner

*Primary Examiner*—Nicholas Ponomarenko
(74) *Attorney, Agent, or Firm*—Nixon Peabody LLP; David S. Safran

(57) ABSTRACT

An arrangement for supplying power to a motor vehicle electrical system (3) by means of a motor driven vehicle generator (1) and a solar generator (2). To efficiently save fuel, for power generation the arrangement compares the output or energy balance of the solar generator (2) relative to the vehicle generator (1) and reduces the vehicle generator output in proportion to the solar current supplied when a positive energy balance exist in favor of the vehicle generator (1) and separates the vehicle generator (1) from the vehicle engine (13) when a positive energy balance exists in favor of the solar generator (2).

12 Claims, 1 Drawing Sheet

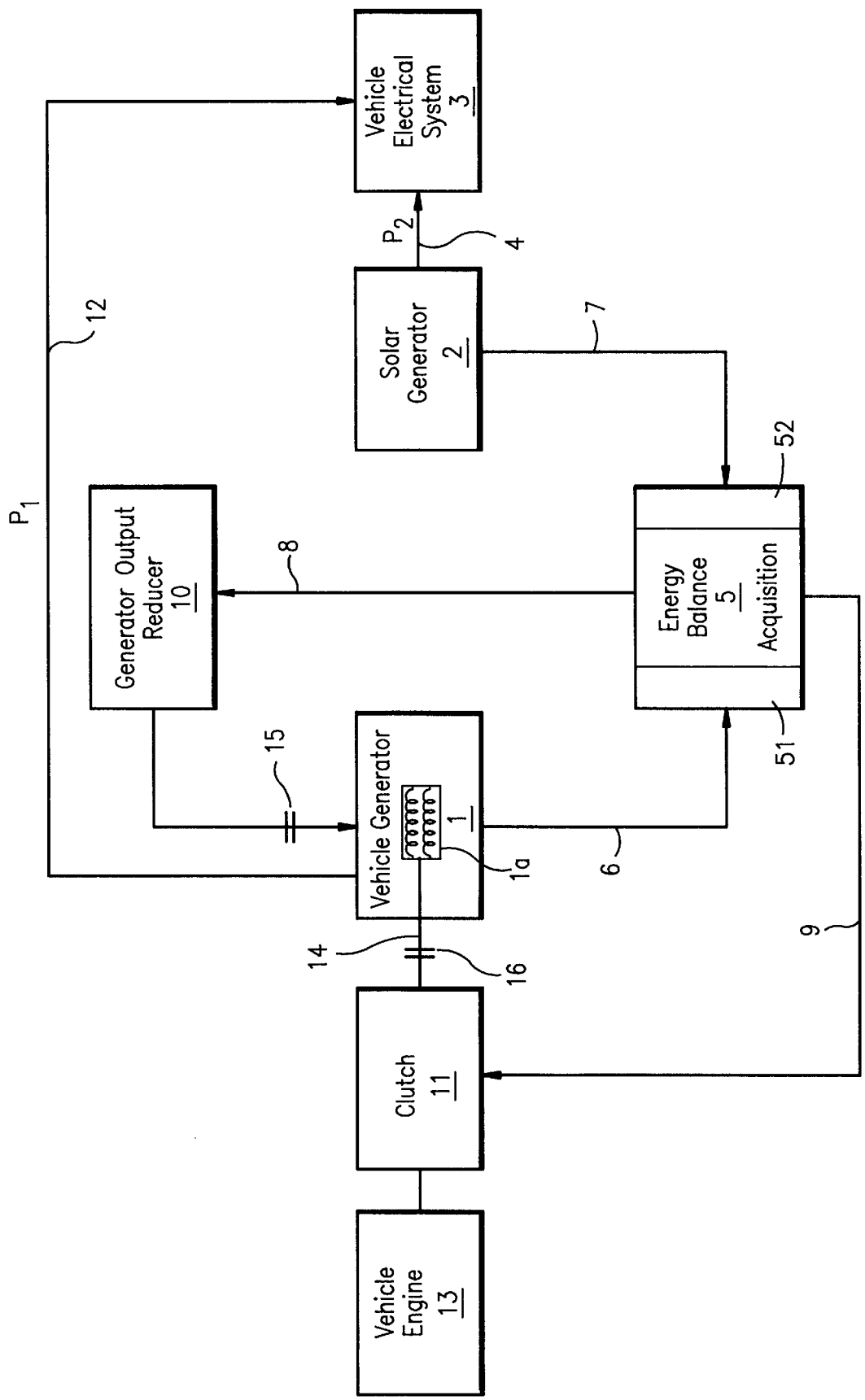

METHOD AND ARRANGEMENT FOR SUPPLYING POWER TO A MOTOR VEHICLE ELECTRICAL SYSTEM

BACKGROUND OF THE INVENTION

1. Field of the Invention

The invention relates to an arrangement for supplying power to a motor vehicle electrical system by means of a generator and a solar generator.

2. Description of Related Art

Conventionally, the consumers or assemblies connected to the motor vehicle electrical system are supplied with power via a generator and a battery connected downstream of it by means of the engine of the motor vehicle. Furthermore, there are numerous proposals for at least in part adding the current made available by a solar generator to this type of power supply; the solar generator is made, for example, in the form of solar cells which are located preferably on the roof of the motor vehicle. One arrangement for supplying power to a motor vehicle electrical system is known, for example, from German Patent DE 36 04 226 C2. There, a power flow sensor acquires the power flow to or from the motor vehicle battery and supplies it to a control means which adds up the power flow over a given time interval, for example, one day. Depending on whether the total acquired there is positive or negative, the control means opens or closes a switch between the motor vehicle battery and the motor vehicle electrical system to prevent excess discharge of the motor vehicle battery.

Another proposal for use of a solar generator for supplying power to the motor vehicle electrical system is known from published German Patent Application DE 39 24 755 A1. In this known arrangement, the solar generator is connected to the motor vehicle battery via a charge control module. The charge control module controls the charging current depending on the battery temperature. The motor vehicle battery is connected via a switching module to different assemblies or power consumers, specifically the motor of a sliding roof and two fan motors. The switching module is controlled by a control module which acquires the temperature in the motor vehicle interior and the humidity above the sliding roof in order to separate or connect the power consumer from the motor vehicle battery depending on these parameters. Here, the motor vehicle battery acts as a buffer between the solar generator and the power consumers.

The above addressed suggestions for partial power supply of the motor vehicle electrical system by means of a solar generator do not take into account the fact that conversion of power from fossil fuels, such as gasoline and diesel, into electrical current via the generator in motor vehicles is associated with very poor overall efficiency. With consideration of different operating conditions of the motor vehicle, fuel consumption of around 0.5 liter per 100 km per 100 Wh of electricity produced can be expected. This is especially critical in conjunction with motor vehicles which are otherwise optimized with respect to their fuel consumption, for example, the three-liter car which is the goal of the automotive industry.

SUMMARY OF THE INVENTION

In view of the above prior art, a primary object of the present invention is to devise an arrangement for supplying power to a motor vehicle electrical system which optimally uses the contribution of a solar generator for power supply and minimizes fuel consumption for power supply via the vehicle engine driven generator.

This object is achieved by a means for separating the vehicle generator from the vehicle engine when the output or energy consumed in the motor vehicle electrical system is less than or equal to the output or energy delivered by the solar generator.

While in the arrangements addressed above the solar generator was used, first of all, to charge the motor vehicle battery, and optionally, for sole operation of selected assemblies or power consumers, the invention takes a completely different approach. Specifically, the contribution of the vehicle generator to supplying of electrical power to the motor vehicle electrical system is partially or completely replaced depending on the power or output balance between the generator and the solar generator; this yields the advantage that less fuel is used to generate power than in the past. Typically, by using the solar generator in accordance with the invention to supply power to the motor vehicle electrical system, while driving, a power consumption of 100 W (which is typically delivered by the vehicle engine driven electric generator) can be equalized when the solar generator is designed to generate a maximum 150 W. Thus, the fuel savings correspond to the initially mentioned fuel consumption of the vehicle generator for power generation of roughly 0.5 liter per 100 km.

Depending on the output or energy balance between the generator output and the solar current supply, according to the invention, an energy balance acquisition means controls a means for reducing the generator output according to the solar current supply at a positive output or energy balance in favor of the vehicle generator is found to exist. On the other hand, additional means are provided by which the vehicle generator is separated from the vehicle engine when a positive output or energy balance is found to exist in favor of the solar generator.

These means for reducing the vehicle generator output or turning it off can basically be accomplished in different ways. Advantageously, the means for reducing the generator output controls power to the exciter winding of the vehicle generator. The means for separating the generator from the vehicle engine, advantageously, comprises a clutch which allows mechanical separation of the generator from the vehicle engine. An integrated magnetic clutch which uses the magnetic field of the exciter winding to control the clutch is preferred. The mechanical part of this clutch can be made, for example, of a conic friction clutch by which one conic part is permanently connected to the drive shaft of the generator, while the other conic part slides movably on this shaft and carries the exciter winding and the corresponding slip rings, this clutch engaging when power is supplied to the exciter winding.

Furthermore, this invention is based on the finding that a major part of the losses of the generator can be attributed to exhaust heat which is dissipated by air cooling at high rpm of the engine and the vehicle generator. Therefore, according to one advantageous development, the invention suggests use of this exhaust heat produced by the vehicle generator to support the passenger compartment heating system of the motor vehicle. For example, there can be water cooling for the generator for this purpose; it being possible for the generator coolant flow to be connected to the remaining engine cooling circuit to use the exhaust heat of the vehicle generator for motor vehicle heating.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

The sole FIGURE schematically depicts an embodiment of an arrangement for supplying power to a motor vehicle electrical system in accordance with the present invention.

DETAILED DESCRIPTION OF THE INVENTION

The arrangement shown in the figure comprises an electric generator 1 (hereafter referred to simply as the "vehicle generator") which is conventionally located in the engine compartment and is driven by the vehicle engine 13 for supplying the motor vehicle electrical system 3 with power $P_1$ via the connecting line 12. The battery ordinarily located between the vehicle generator 1 and the motor vehicle electrical system 3 is not shown. In addition, the power consumers or assemblies of the vehicle that are connected to the motor vehicle electrical system 3 are also not shown. The invention also comprises a solar generator 2 which, in a conventional manner, is located on the roof of the motor vehicle and is integrated there, for example, at least partially into a sunroof cover panel. The solar generator 2 delivers solar energy derived current $P_2$ to the motor vehicle electrical system 3 via a connecting line 4. Thus, the total power $P_t$ equals the sum of $P_1$ and $P_2$, i.e., $P_t=P_1+P_2$.

Further-more, to determine the power generated by the vehicle generator 1 and the solar generator 2, they are connect to energy detecting devices 51, 52 via connecting lines 6 and 7. The detecting devices 51, 52 measure, e.g., the output of the vehicle generator 1 and solar generator 2, respectively, or the current flow between the vehicle generator 1 and solar generator 2 and the vehicle electrical system 3. An energy balance acquisition means 5 is connected on the output side of the detecting devices 51, 52 and compares $P_t$ with $P_2$. In the event that $P_t \geq P_2$, a signal is sent via line 9 to the clutch 11 causing it to engage while a signal causing the clutch to disengage the vehicle generator 1 from the vehicle engine 13, eliminating $P_1$, is sent via line 9 when $P_t \leq P_2$. Information about the size of $P_1$ and $P_2$ relative to $P_t$ is sent by the energy balance acquisition means 5 to a generator output reducer 10. The energy balance acquisition means 5 together with the generator output reducer 10 have the function of a conventional voltage regulator for the vehicle generator 1, the generator output reducer, preferably, controlling power to the exciter winding 1g of the vehicle generator 1 so that, if less energy is required via line 12 because of a decrease in $P_t$, or due to an increase in $P_2$ the output power $P_1$ of the vehicle generator 1 is reduced. The energy balance acquisition means 5 can periodically compare the power generated by the vehicle generator 1 with that produced by the solar generator 2 over a certain time interval, or it can compare the generated outputs as instantaneous consumption.

To avoid repeated engaging and disengaging of the clutch 11 when $P_t \approx P_2$, the energy balance acquisition means 5 is preferably provided with two different switching thresholds for engaging and disengaging of the clutch 11 to thereby compensate for hysteresis effects.

The structure of clutch 11, for separating the vehicle generator 1 from the vehicle engine 13, is not shown, but it can be of known construction. Preferably, a magnetic clutch 15 is used which includes the field of the exciter winding 1a of the vehicle generator 1 and has a friction clutch element 16 with a first part which is connected permanently to the drive shaft 14 of the vehicle generator 1 and with a second part which is located to slide on the first part and which carries the exciter winding 1a, the clutch engaging to supply current to the exciter winding. More specifically, the mechanical part of this clutch can be made, for example, of a conic friction clutch by which one conic part is permanently connected to the drive shaft 14 of the generator, while the other conic part slides movably on this shaft 14 and carries the exciter winding 1a and the corresponding slip rings, this clutch engaging when power is supplied to the exciter winding 1a.

The arrangement shown in the figure operates as follows. The energy balance acquisition means 5 actuates the means 10 for reducing the generator output according to the solar current supply from the solar generator 2 to the motor vehicle electrical system 3 when there is a positive balance in favor of the vehicle generator 1. On the other hand, the means 5 actuates the means 11 for separating the vehicle generator 1 from the vehicle engine 13 in the case in which there is a positive power or energy balance in favor of the solar generator 2. This results in the engine 13 of the vehicle needing to drive the vehicle generator 1 energy only to the extent that the solar generator 2 is unable to supply the vehicle electrical system 3 with power. In this way, with the corresponding incident solar radiation, a clear fuel reduction is achieved which yields a major advantage mainly with respect to the three-liter car which is an automotive industry goal.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. An arrangement for supplying power to a motor vehicle electrical system by means of a vehicle generator in driven connection to a vehicle engine and by means of a solar generator, said arrangement comprising:

means for comparing the output or energy balance of the solar generator relative to the output or energy balance of the vehicle generator;

means for reducing vehicle generator output in proportion to current supply from the solar generator as long as the output or energy consumed in the motor vehicle electrical system is greater than the output or energy delivered by the solar generator; and means for disengaging the vehicle generator from driven connection to the vehicle engine when the output or energy consumed in the motor vehicle electrical system is less than or equal to the output or energy delivered by the solar generator;

wherein said means for disengaging and said means for reducing are controlled by said means for comparing.

2. Arrangement as claimed in claim 1, wherein the means for reducing the generator output controls power to an exciter winding of the vehicle generator.

3. Arrangement as claimed in claim 2, wherein the means for disengaging the vehicle generator from the vehicle engine comprises a clutch.

4. Arrangement as claimed in claim 3, wherein the clutch comprises a magnetic clutch which includes the field of the exciter winding of the vehicle generator and has a friction clutch element, a first part of which is connected permanently to a drive shaft of the vehicle generator and a second part of which is located to slide on the first part and which carries the exciter winding, the clutch engaging to supply current to the exciter winding.

5. Arrangement as claimed in claim 1, wherein a cooling means is provided for removing exhaust heat from the vehicle generator and means for utilizing the heat removed for heating the motor vehicle.

6. Arrangement as claimed in claim 5, wherein the cooling means comprises a liquid coolant circuit in heat transfer relation to the vehicle generator.

7. Arrangement as claimed in claim 6, wherein the liquid coolant circuit is connected to an engine cooling circuit of the vehicle.

8. Arrangement as claimed in claim 1, wherein the means for separating the vehicle generator from the vehicle engine comprises a clutch.

9. Arrangement as claimed in claim 8, wherein the clutch comprises a magnetic clutch which includes a field of an exciter winding of the vehicle generator and has a friction clutch element, a first part of which is connected permanently to a drive shaft of the vehicle generator and a second part of which is located to slide on the first part and which carries the exciter winding, the clutch engaging to supply current to the exciter winding.

10. Arrangement as claimed in claim 1, further comprising a first power measuring device connected to the vehicle generator for measuring the power output, $P_1$, of the vehicle generator and a second power measuring device connected to the solar generator for measuring the power output, $P_2$, of the solar generator; and wherein said means for comparing compares the total power, $P_t$, required by the vehicle electrical system and triggers said means for disengaging when $P_t \leq P_2$.

11. Arrangement as claimed in claim 10, wherein the said means for comparing is connected to the means for reducing for providing a signal indicative of the power outputs the power output, $P_1$, of the vehicle generator and the power output, $P_2$, of the solar generator to the means for comparing when $P_t > P_2$; and wherein said means for reducing is operative for reducing the power output $P_1$ of the vehicle generator to a reduced power output $P_r$ in accordance with the relationship $P_r = P_t - P_2$ in response to the signal from said means for comparing.

12. A method of supplying power to a motor vehicle electrical system by means of a vehicle generator driven by a vehicle engine and by a solar generator, said method causing to reduce fuel consumption by the vehicle engine and comprises the steps of:

comparing the output or energy balance of the solar generator relative to the output or energy balance of the vehicle generator;

reducing the vehicle generator output in proportion to the solar current supplied by the solar generator as long as the output or energy consumed in the motor vehicle electrical system is greater than the output or energy delivered by the solar generator; and separating the vehicle generator from driven connection to the vehicle engine as long as the output or energy consumed in the motor vehicle electrical system is less than or equal to the output or energy delivered by the solar generator.

\* \* \* \* \*